United States Patent
McCurdy et al.

(10) Patent No.: US 6,561,723 B2
(45) Date of Patent: *May 13, 2003

(54) HIGH TENSILE TIE ROD CONNECTOR

(76) Inventors: Michael M. McCurdy, 1922 Abilene, League City, TX (US) 77573; Rick Baker, 15422 Bay Cove Ct., Houston, TX (US) 77059; Jerry C. Stefka, 903 E. Miller St., Angelton, TX (US) 77515

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/495,003

(22) Filed: Jan. 31, 2000

(65) Prior Publication Data

US 2002/0086261 A1 Jul. 4, 2002

(51) Int. Cl.⁷ .................................................. F16D 1/02
(52) U.S. Cl. ....................... 403/312; 403/307; 403/310; 403/313; 403/344
(58) Field of Search ................................ 403/307, 312, 403/313, 344, 311, 310, 195, 196, 199, 200, 340, 309

(56) References Cited

U.S. PATENT DOCUMENTS

| | | | | |
|---|---|---|---|---|
| 157,427 | A | * 12/1874 | Stuart | ............... 403/312 |
| 316,919 | A | * 4/1885 | Stuart | ............... 403/312 |
| 444,649 | A | 1/1891 | Nolan | |
| 448,087 | A | 3/1891 | Simonson | |
| 611,556 | A | 9/1898 | Blanton, Jr. | |
| 698,847 | A | 4/1902 | McDonald et al. | |
| 907,523 | A | * 12/1908 | Perry | ............... 403/312 |
| 907,539 | A | * 12/1908 | Thomas | ............... 403/312 |
| 1,018,263 | A | * 2/1912 | Novitski | ........... 403/344 X |
| 1,580,780 | A | * 4/1926 | Dixon et al. | ............. 403/344 |
| 1,656,935 | A | * 1/1928 | Bahan | ............ 403/344 X |
| 1,778,233 | A | 10/1930 | Staples | |
| 3,074,293 | A | 1/1963 | Langsetmo | |
| RE26,011 | E | 5/1966 | Girard | |
| 3,397,431 | A | 8/1968 | Walker | |
| 3,588,152 | A | 6/1971 | Shomo | |
| 3,672,613 | A | 6/1972 | Oriani | |
| 3,850,535 | A | * 11/1974 | Howlett et al. | ............. 403/312 |
| 3,917,424 | A | 11/1975 | Zugel | |
| 4,128,355 | A | 12/1978 | Leaf | |
| 4,143,986 | A | 3/1979 | Antosh | |
| 4,428,697 | A | 1/1984 | Ruland | |
| 4,469,465 | A | 9/1984 | Andrus | |
| 4,637,750 | A | * 1/1987 | Ward | ............. 403/344 |

(List continued on next page.)

FOREIGN PATENT DOCUMENTS

| | | | | |
|---|---|---|---|---|
| AU | 213157 | * | 1/1961 | ............ 403/310 |
| AU | 31241 | * | 5/1979 | ............ 403/312 |
| DE | 89918 | | 1/1897 | |
| DE | 458068 | | 10/1913 | |
| DE | 177910 | * | 3/1954 | ............ 403/312 |
| GB | 1799 | | 11/1899 | |
| GB | 182186 | | 6/1922 | |
| GB | 1546254 | * | 5/1979 | ............ 403/307 |
| SU | 619696 | | 8/1975 | |

*Primary Examiner*—Anthony Knight
*Assistant Examiner*—David E. Bochna
(74) *Attorney, Agent, or Firm*—Shook, Hardy & Bacon LLP (57) ABSTRACT

A high tensile rod connector is provided that includes a first section having an internally threaded surface and a second section having an internally threaded surface. The threads of the first section mate with the threads of the second section. A pair of first flanges is rigidly coupled to the first section and extends outwardly therefrom. Similarly, a pair of second flanges is rigidly coupled to the second section. A series of bolts extends from the first flanges to the second flanges. The bolts are adapted to removably couple the first section to the second section. The first and second sections may be located on a damaged tie rod and secured thereto, thereby repairing the damaged tie rod without removing tension therefrom.

7 Claims, 6 Drawing Sheets

U.S. PATENT DOCUMENTS

| | | | |
|---|---|---|---|
| 4,723,053 A | | 2/1988 | Amaya |
| 4,747,723 A | * | 5/1988 | Hasley .................. 403/310 X |
| 4,840,194 A | * | 6/1989 | Berry ........................ 138/155 |
| 4,902,158 A | * | 2/1990 | Broszat et al. .......... 403/307 X |
| 5,069,054 A | | 12/1991 | Hladky et al. |
| 5,681,126 A | | 10/1997 | Lin |
| 5,746,555 A | * | 5/1998 | McEvoy ................. 403/307 X |
| 5,967,691 A | * | 10/1999 | Lancelot, III ............... 403/313 |

* cited by examiner

HIGH TENSILE TIE ROD CONNECTOR

STATEMENT REGARDING FEDERALLY SPONSORED RESEARCH OR DEVELOPMENT

Not Applicable.

CROSS-REFERENCE TO RELATED APPLICATIONS

Not Applicable.

BACKGROUND OF THE INVENTION

This invention relates to a connectors for use in bulkhead construction. More particularly the invention relates to tie rod connectors for use in repairing weakened or damaged tie rods without the need to cut the tie rod or remove it from service.

Certain coastal structures are classified by the functions they serve and by their structural features. Primary functional classes include seawalls, revetments, groins, jetties, breakwaters, piers, wharfs and bulkheads. A bulkhead is a structure that can be constructed parallel or nearly parallel to the shoreline and the land-sea interface. One purpose for constructing a bulkhead is to maintain the shoreline in an advanced position, as well as preventing further shoreline recession. A bulkhead acts primarily as a land retaining structure.

In a typical bulkhead, a retaining wall is constructed by anchoring steel sheeting in place. The steel sheeting extends upwardly above the surface for a desired distance. The steel sheeting may also be replaced with a series of steel columns. The steel sheeting must be properly supported in order for the bulkhead to achieve its purpose. To support the steel sheeting or the steel columns, a series of spaced, tensioned tie rods are used. The tie rods extend from the steel sheeting or columns and are typically anchored in concrete. After the tie rods are secured in the concrete and to the sheeting, they are placed in tension to support the sheeting.

After the bulkhead is constructed and put in use, the anchoring tie rods can become damaged. If a tie rod is damaged, the bulkhead can be weakened. When a tie rod is damaged, the adjacent rods are subjected to an increased load. This increased loading on adjacent tie rods increases the chances of a bulkhead failure. Therefore, when a tie rod has been damaged or weakened, it is desirable to repair the damaged rod as quickly as possible. A complete replacement of the damaged rod is an expensive and time consuming process that often involves driving temporary steel sheet piling to create a tie back.

An existing prior art coupler exists that does allow two tie rods to be connected to one another. This prior art coupled is a one-piece construction which can only be used in the initial construction of the bulkhead. Because this prior art coupler is a one piece construction, it cannot be used to repair a tie rod that is in use and that has been damaged without replacing the entire tie rod.

Therefore, a device is needed that overcomes the above drawbacks and disadvantages existing in the prior art. More particularly, a device is needed that allows repairs to be made to tie rods when the tie rods become damaged. The device needs to allow repairs to be made without completely replacing the tie rod, and without placing the adjacent tie rods under increased loads.

SUMMARY OF THE INVENTION

It is therefore an object of the present invention to provide a high tensile tie rod connector that can be used to repair a tie rod under tension.

It is another object of the present invention to provide a high tensile tie rod connector that can be used to repair a damaged tie rod without completely replacing the entire tie rod.

To accomplish these and other related objects, a high tensile rod connector is provided that includes a first section having an internally threaded surface and a second section having an internally threaded surface. The threads of the first section mate with the threads of the second section. A pair of first flanges is rigidly coupled to the first section and extends outwardly therefrom. Similarly, a pair of second flanges is rigidly coupled to the second section. A series of bolts extends from the first flanges to the second flanges. The bolts are adapted to removably couple the first section to the second section. The first and second sections may be located on a damaged area of a tie rod and secured thereto, thereby repairing the damaged tie rod without removing tension therefrom.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE PREFERRED EMBODIMENT

Figure 1:
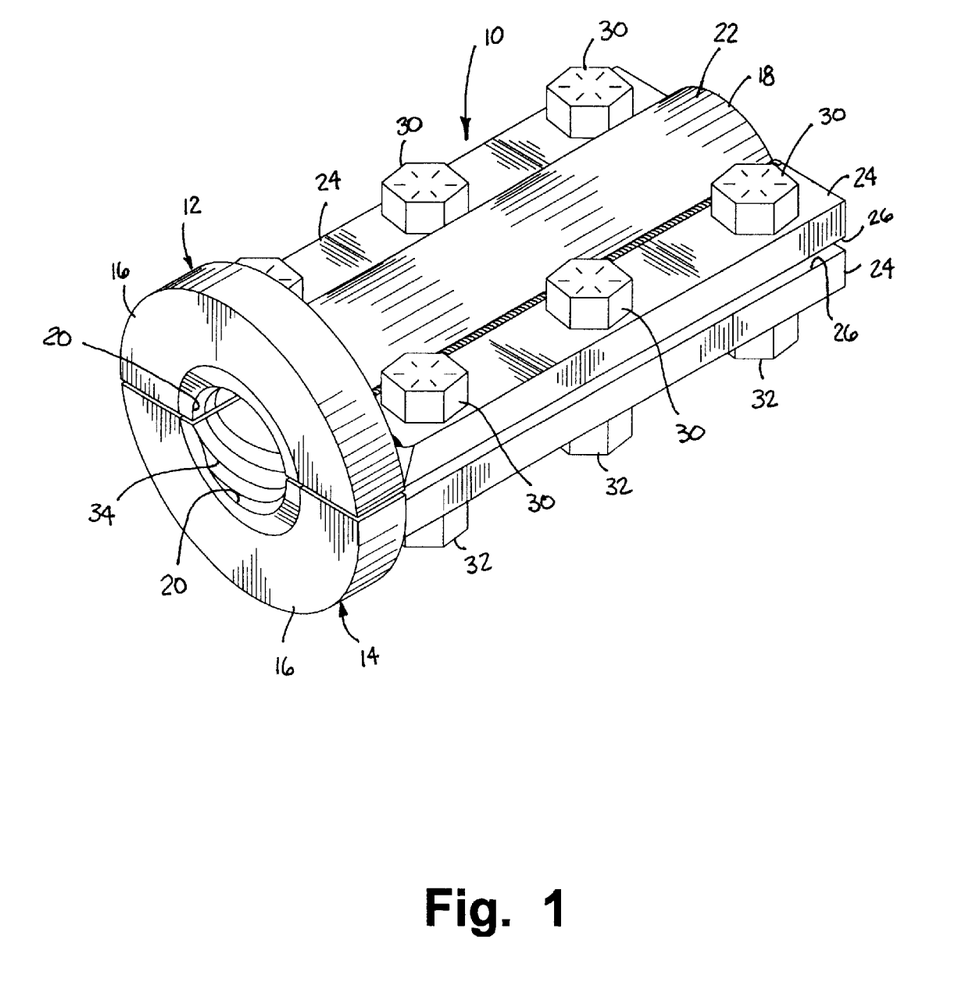
FIG. 1 is a perspective view of a high tensile tie rod connector according to the present invention.
Figure 2:
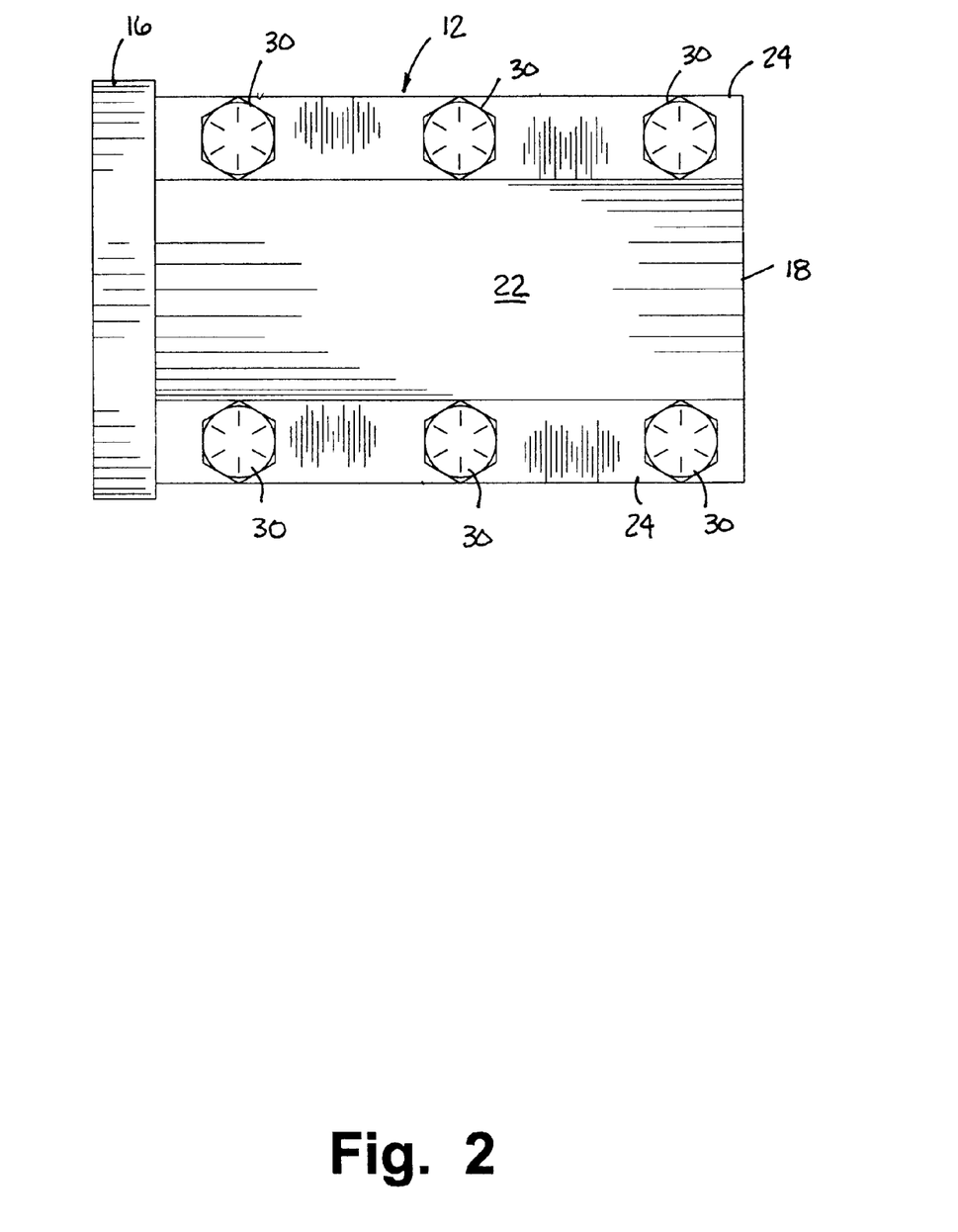
FIG. 2 is a top plan view of the connector of FIG. 1.

Referring now to the drawings in greater detail, and initially to FIG. 1, a high tensile tie rod connector is shown by the reference numeral 10. Connector 10 can be formed from a variety of materials, such as carbon steel, stainless steel or any other material compatible with the tie rod to which connector 10 is attached. The materials used should, however, be of a grade equal to or greater than the composition of the tie rods to which connector 10 will be attached. Connector 10 can be manufactured by casting or by known fabrication techniques.

Figure 4:
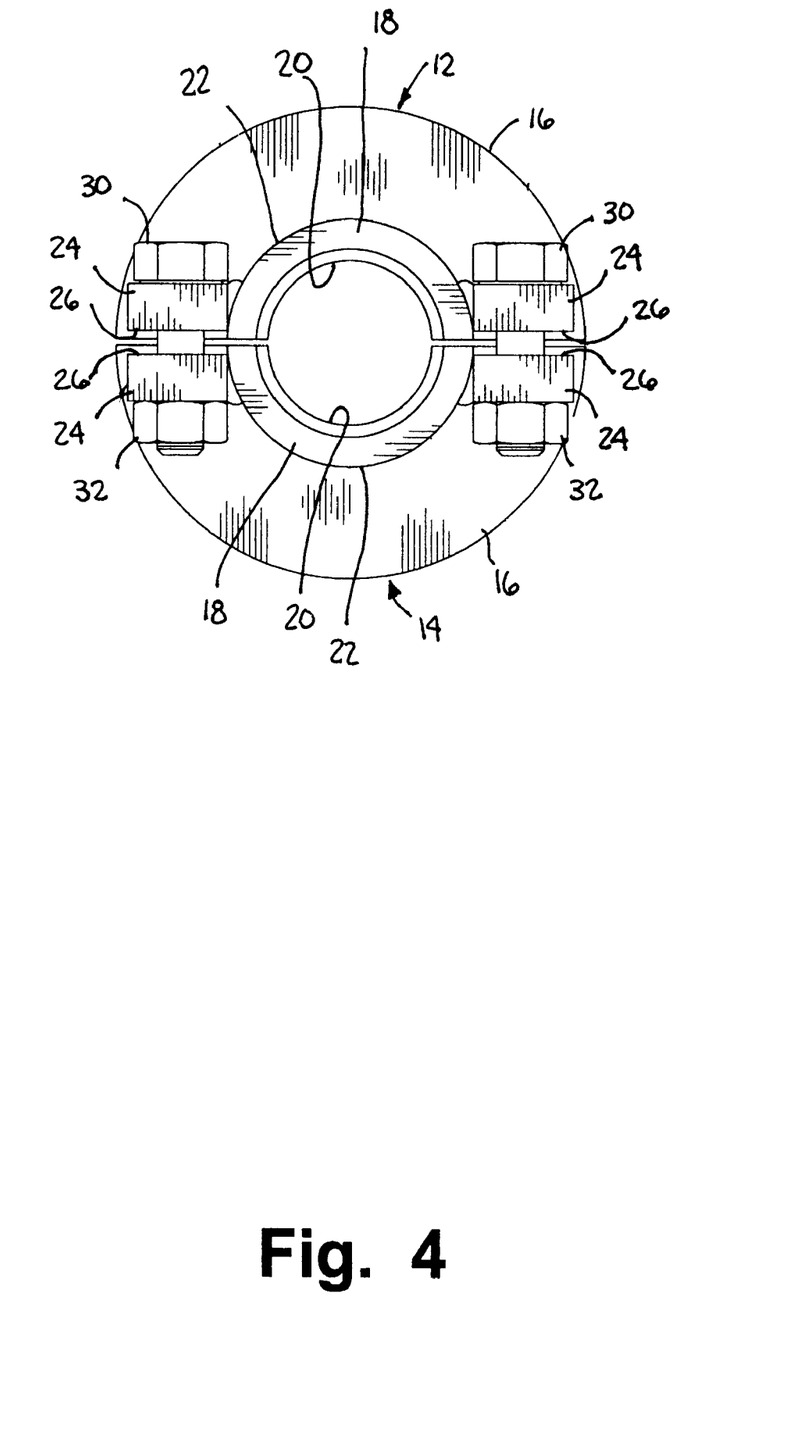
FIG. 4 is a rear elevation view of the connector of FIG. 1.
Figure 5:
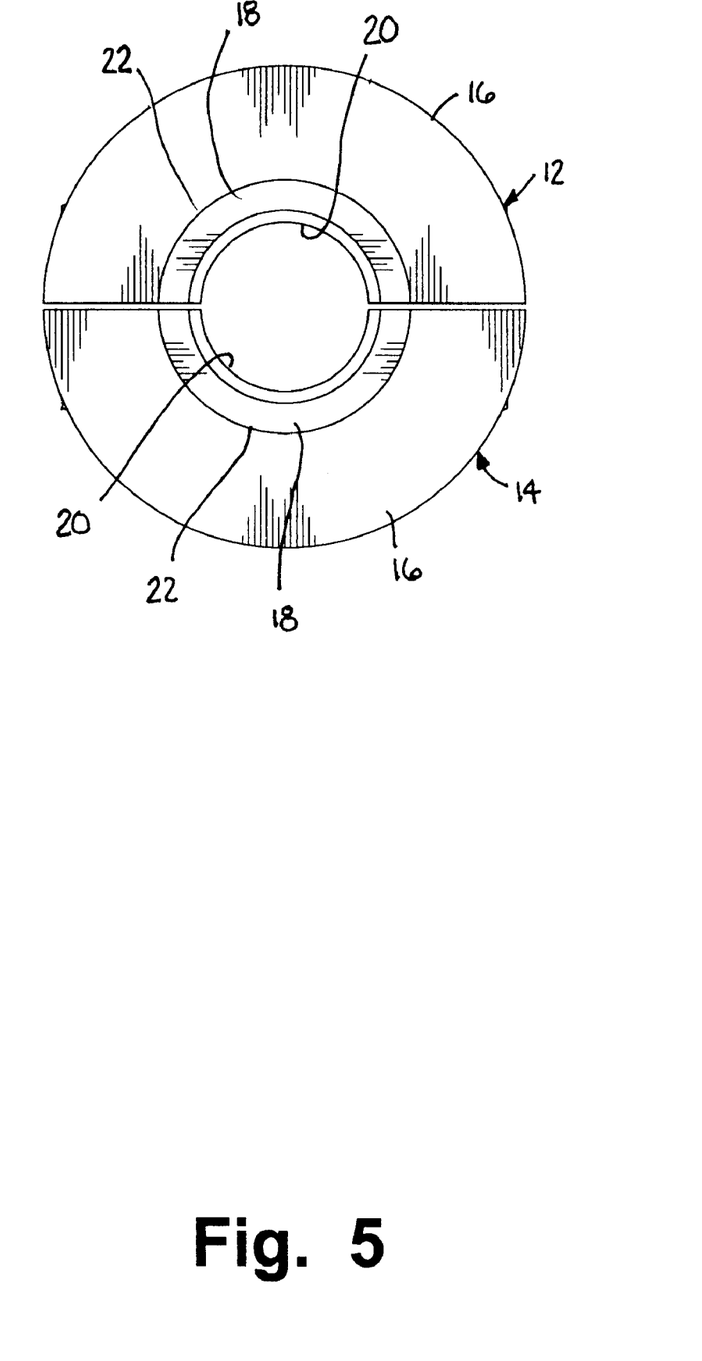
FIG. 5 is a front elevation view of the connector of FIG. 1.
Figure 6:
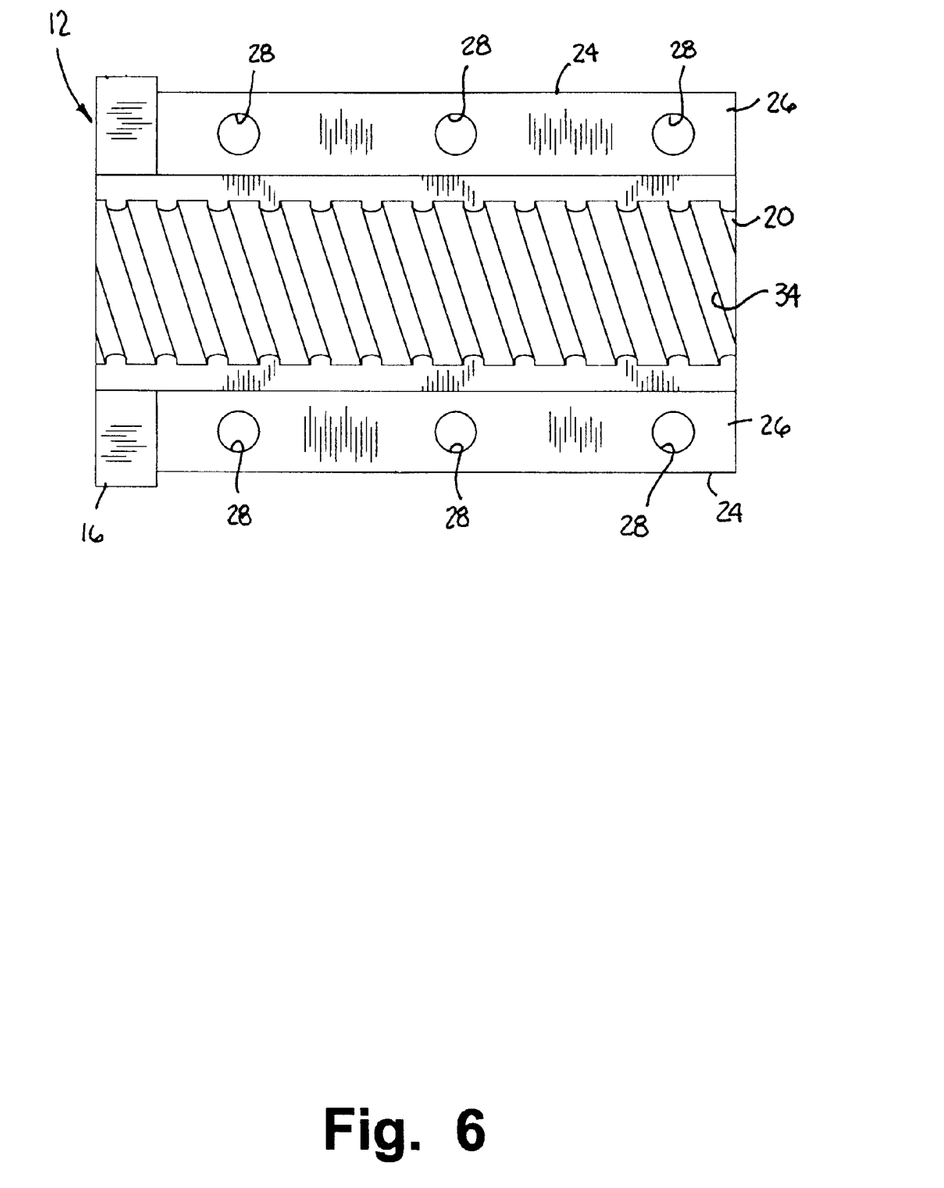
FIG. 6 is a cross sectional view taken along line 6—6 of FIG. 3.

Connector 10 has a first section 12 and a second section 14. Sections 12 and 14 are preferably mirror images of one another. Each section 12, 14 has a generally arcuate bearing plate 16. It should, of course, be understood that other shapes for plate 16 could be used without departing from the scope of the present invention. A threaded pipe 18 is rigidly secured to the inner radial surface of plate 16, such as by welding. Pipe 18 could also be formed with plate 16 to form a one-piece structure. As best seen in FIG. 6, pipe 18 has an inner surface 20 which is threaded along its entire length. As best seen in FIG. 4, pipe 18 has an arcuate outer surface 22. It should be understood, however, that shapes other than the arcuate shape shown in the drawings could be used without departing from the scope of this invention.

Figure 3:
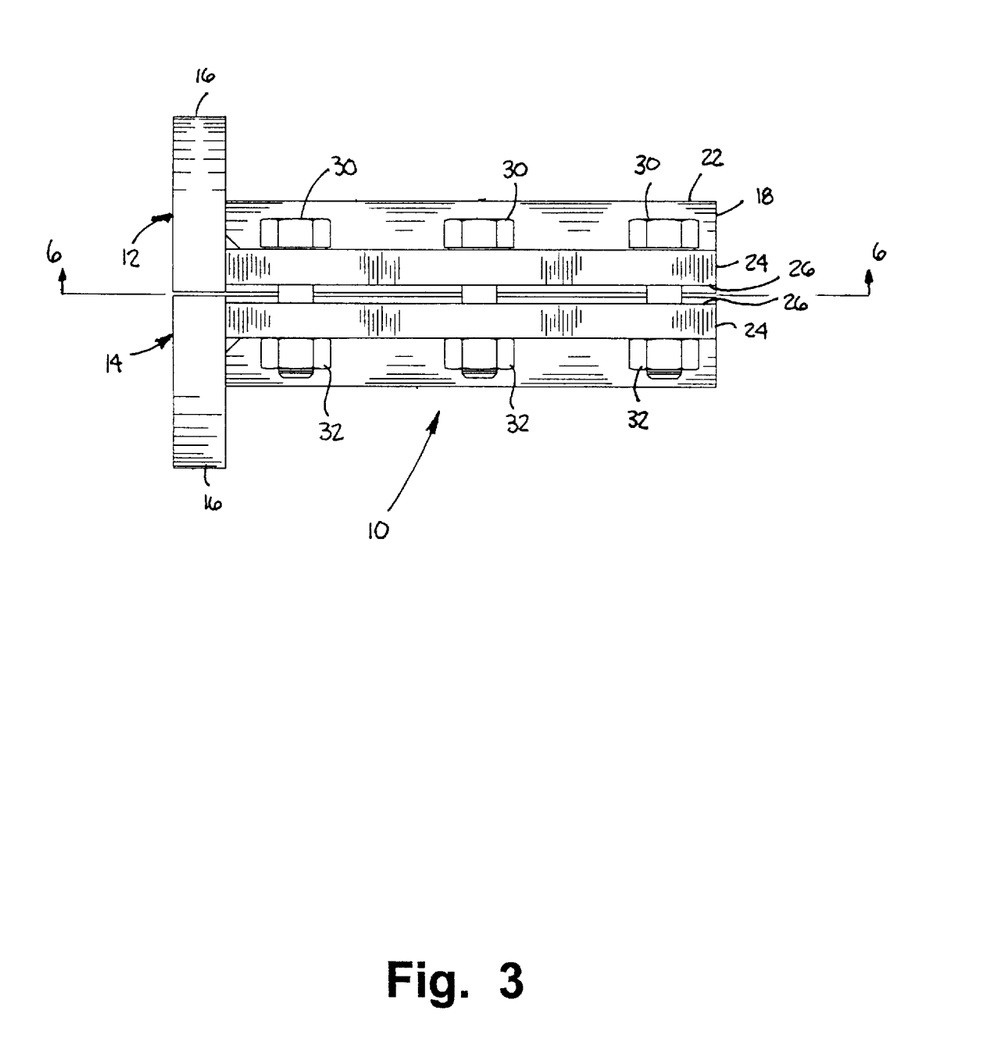
FIG. 3 is a side elevation view of the connector of FIG. 1.

Extending outwardly from each side of pipe 18 and secured to outer surface 22 is a flange 24. Flanges 24 extend outwardly from pipe 18 approximately the distance aligning with the outer-most diameter of bearing plate 16. Preferably, flanges 24 are secured to pipe 18 by welding, although the flanges could be integrally formed with pipe 18. For additional support, flanges 24 are welded to plate 16 along the area of flanges 24 that abuts plate 16. As best seen in FIGS. 3 and 4, each flange 24 of section 12 has a surface 26 that is oriented to face a corresponding surface 26 of section 14. Preferably, surfaces 26 are located so that the spacing therebetween is greater than the spacing between the plates 16 and pipes 18. Flanges 24 are used to secure connector 10 in place along a tie rod, as more fully described below. As best seen in FIG. 6, each flange 24 has a series of throughholes 28 therein that accommodate a like number of attachment bolts 30 and nuts 32.

As best seen in FIG. 6, and as described above, inner surface 20 of pipe 18 is formed with a continuous thread 34. Threads 34 can be any of the standard thread sizes currently in use, and are preferably selected to match the threads formed in the tie rod to which connector 10 will be attached. It should be understood that the present invention could also be used where the tie rods to which the connector 10 is attached are not threaded.

Connectors 10 can be used to repair a damaged or weakened tie rod associated with a bulkhead. In use, the area of the damaged tie rod is located. The tie rods are under tension and can be repaired with connectors 10 without unloading this tension. After the area needing repair has been located, section 12 is separated from section 14 by removing nuts 32 from bolts 30. Sections 12 and 14 are then placed around the damaged area of the tie rod and bolts 30 are placed through holes 28. Nuts 32 are threaded onto bolts 30 and are partially tightened. If the damage to the tie rod is located adjacent the steel sheeting or steel columns of the bulkhead, connector 10 is rotated on the tie rod until plate 16 is abutting the steel sheeting or steel column. The bolts 30 and nuts 32 are then tightened to secure connector 10 in place. It can therefore be seen that the above-described invention can be used to repair a damaged or weakened tie rod without completely removing and replacing the tie rods. This repair can be done relatively quickly and easily before any damage has been done to adjacent tie rods. The connector can be used as a temporary or permanent support depending on the method of repair or replacement. In either case, the bolts can be loosened slowly so the connector tension is reduced and safely transfer loads from one tie rod to another.

While the connector described above has two separate sections 12 and 14, it should be understood that sections 12 and 14 could be hingedly coupled along one side thereof. The important feature is to allow connector 10 to be installed on a tensioned tie rod without having to remove the tension from the tie rod. This feature allows connector 10 to be installed on the tie rod without removing the tie rod from service.

Moreover, while it is not the primary purpose of the invention, connectors 10 could also be used as a coupler to couple together two tie rods prior to tensioning. Further, while the above-described connector 10 uses bolts 30 and nuts 32, other clamping mechanisms could also be used and are within the scope of the present invention.

From the foregoing, it will be seen that this invention is one well adapted to attain all of the ends and objects hereinabove set forth, together with other advantages which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. An internally threaded high tensile rod connector for mating with an externally threaded high tensile rod at a position intermediate the ends of the rod, comprising:

a first section having an internally threaded surface;

a second section having an internally threaded surface, the threads of the first section complementing the threads of the second section to form the internally threaded connector;

a pair of first flanges rigidly coupled to the first section;

a pair of second flanges rigidly coupled to the second section;

a first bearing plate rigidly secured to one end of the first section;

a second bearing plate rigidly secured to a corresponding end of the second section; and a series of bolts extending from the first flanges to the second flanges, the bolts adapted to removably couple the first section to the second section, wherein the internally threaded connector mates with the externally threaded high tensile rod at a position intermediate each end of the rod and can move along the axis of the rod by rotation of the connector.

2. The connector of claim 1, wherein the first and second sections have an arcuate exterior surface.

3. The connector of claim 2, wherein the first flanges have a lower-most surface and the second flanges have an upper-most surface that is oriented to face the lower-most surface, and wherein the spacing between the upper-most surface of the second flanges and the lower-most surface of the first flanges is greater than the spacing between the first and second sections.

4. An internally threaded high tensile rod connector for mating with an externally threaded high tensile rod at a position intermediate the ends of the rod, comprising:

a first section having an internally threaded surface;

a second section having a uniformly internally threaded surface, the threads of the first section complementing the threads of the second section to form the uniformly internally threaded connector;

a pair of first flanges rigidly coupled to the first section;

a pair of second flanges rigidly coupled to the second section;

a first bearing plate rigidly secured to one end of the first section;

a second bearing plate rigidly secured to a corresponding end of the second section; and a means for removably connecting the first flanges to the second flanges, wherein the internally threaded connector mates with the externally threaded high tensile rod at a position intermediate each end of the rod and can move along the axis of the rod by rotation of the connector.

5. The connector of claim 4, wherein the first and second sections have an arcuate exterior surface.

6. The connector of claim 5, wherein the first flanges have a lower-most surface and the second flanges have an upper-most surface that is oriented to face the lower-most surface, and wherein the spacing between the upper-most surface of the second flanges and the lower-most surface of the first flanges is greater than the spacing between the first and second sections.

7. An internally threaded high tensile rod connector for mating with an externally threaded high tensile rod at a position intermediate the ends of the rod, comprising:

a first section having an internally threaded surface;

a second section having an internally threaded surface, the threads of the first section complementing the threads of the second section to form the internally threaded connector;

a first semi-circular bearing plate rigidly secured to one end of the first section;

a second semi-circular bearing plate rigidly secured to a corresponding end of the second section; and a means for removably connecting the first section to the second section, wherein the internally threaded connector mates with the externally threaded high tensile rod at a position intermediate each end of the rod and can move along the axis of the rod by rotation of the connector.

* * * * *